United States Patent [19]

Shute et al.

[11] Patent Number: 4,655,705
[45] Date of Patent: Apr. 7, 1987

[54] POWER GAS BURNER FOR WOOD STOVE

[76] Inventors: Alan B. Shute, R.R. #2, Box 1006, Stowe, Vt. 05672; Carl W. Suchovsky, 10152 Pirates Trail, Aurora, Ohio 44202; Richard J. Bazzo, 14139 Pine Forest Dr., Apt. 104, North Royalton, Ohio 44133

[21] Appl. No.: 834,803

[22] Filed: Feb. 28, 1986

[51] Int. Cl.⁴ .............................................. F23N 5/00
[52] U.S. Cl. ....................................... 431/78; 431/69; 431/73; 431/258; 431/347
[58] Field of Search ................... 431/69, 71, 73, 78, 431/258, 347

[56] References Cited

U.S. PATENT DOCUMENTS

3,542,501 11/1970 Jones .................................... 431/258
3,787,169 1/1974 Gjerde .................................. 431/347

Primary Examiner—Carroll B. Dority, Jr.
Attorney, Agent, or Firm—Prutzman, Kalb, Chilton & Alix

[57] ABSTRACT

A power burner adaptable for use in conjunction with a wood burning stove employs a blower to produce a forced flow of air and a fuel valve which provides selective fuel communication with a fuel nozzle. Forced air and fuel is mixed in the nozzle and propelled through the nozzle outlet along a generally unidirectional exit path. A target is spaced from the nozzle outlet and interposed in the exit path. A heating assembly which is spaced from the target heats the target to a temperature sufficient to ignite the mixture traversing the exit path. A blast tube surrounds the target and forms an axially extending passageway which functions as a combustion chamber and a passageway for propelling the combusted fuel through an outlet opening of the blast tube. The burner is automatically controlled by an electronic controller.

8 Claims, 7 Drawing Figures

POWER GAS BURNER FOR WOOD STOVE

BACKGROUND OF THE INVENTION

This invention relates generally to power gas burners which employ a forced supply of air. More particularly, the present invention relates to an automatic combustion ignition system which is adaptable for use in wood stoves.

Power burners which employ a blower to generate a primary and a secondary air flow for the combustion of natural gas or liquified propane have been employed in a wide variety of applications. The present invention is directed to providing a new and improved power gas burner which is especially adaptable for use in conjunction with a wood burning stove. The incorporation of a power gas burner into a wood burning stove to provide both an ignition system for wood in the fire box of the stove and a second source of heat for the stove involves a number of safety and operational design considerations. The design parameters include the provision of a power gas burner having a dimensional size and a thermal capacity which is compatible with the requirements of a wood burning stove. In addition, the power gas burner controls must be coordinated with the operational characteristics of the wood burning stove in order that the power gas burner may be effectively utilized and efficiently integrated with the conventional wood burning process of the wood burning stove.

Accordingly, a principal aim of the present invention is to provide a new and improved power gas burner which is adaptable for use in a wood and/or coal burning stove as both a system for automatically igniting the fuel supply within the fire box and as a system for generating a secondary source of heat for the stove. In addition, an aim of the present invention is to provide an automatic control system which coordinates the operation of the power gas burner with the conventional operation of the wood burning stove so that the power gas burner and wood stove may be automatically operated and controlled as an integrated heat producing system in an efficient and safe manner.

SUMMARY OF THE INVENTION

Briefly stated, the invention in a preferred form is a power burner adaptable for use in conjunction with a wood burning stove. A blower is selectively energizable to produce a forced flow of air. A fuel supply assembly employs a fuel valve which provides selective fuel communication between a fuel inlet and a delivery conduit. A burner nozzle has a first inlet which communicates with the forced air flow and a second inlet which communicates with the delivery conduit. A mixture of air and fuel in the nozzle is propelled through the nozzle outlet along a generally unidirectional exit path. A secondary nozzle communicates with the forced air flow for directing a secondary air stream in the vicinity of the mixture in the exit path. A target is spaced from the nozzle outlet and is interposed in the exit path. A heating assembly is spaced from the target to heat the target to a temperature sufficient to ignite the mixture traversing the exit path. A blast tube surrounds the target and forms an axially extending passageway having an outlet opening. An electronic controller is automatically responsive to various operational conditions so that when fuel is supplied to the fuel inlet, the blower is energized, the fuel valve is activated and the target is heated to combust fuel in the blast tube and propel the combusted fuel toward the outlet opening of the blast tube.

The blast tube has a substantially cylindrical shape with the nozzle outlet and the heating assembly being positioned at one end of the blast tube opposite the outlet opening. A collar radially extends from the blast tube at an intermediate axial position of the blast tube. A temperature switch is mounted to the blast tube in an axial location generally aligned with the axial position of the target to sense a pre-established temperature threshold. The switch means is a bi-metallic assembly which activates an electrical switch in the event that the temperature inside the target exceeds a pre-established threshold. Both the fuel nozzle and the secondary nozzle comprise tubes of generally cylindrical shape which are positioned in generally co-axial relationship.

DETAILED DESCRIPTION OF THE INVENTION

With reference to the drawings wherein like numerals represent like parts throughout the figures, a power gas burner in accordance with the present invention is generally designated by the numeral 10. Power gas burner 10 is especially adapted for mounting to a wood stove 12 so that a mounting collar of the burner abuts against the rear panel 14 of the stove and a forward section of the burner extends interiorly through a rear opening into the fire box 16 of the wood stove. In a preferred mounting configuration, the foward section extends approximately one inch into the fire box and is located approximately one-half inch above the bottom of the fire box.

The power gas burner 10 has a compact form which in a preferred embodiment occupies a space exteriorly to the stove of approximately 10 inches by 10 inches by 8 inches and has a thermal capacity ranging between approximately 30,000 to 65,000 BTUs per hour. The power gas burner burns natural gas or liquified propane gas which may be supplied from an auxiliary tank (not illustrated) or other conventional means. A remote electrical power supply is employed to control, operate and monitor the burner system as will be detailed hereinafter.

Figure 1:
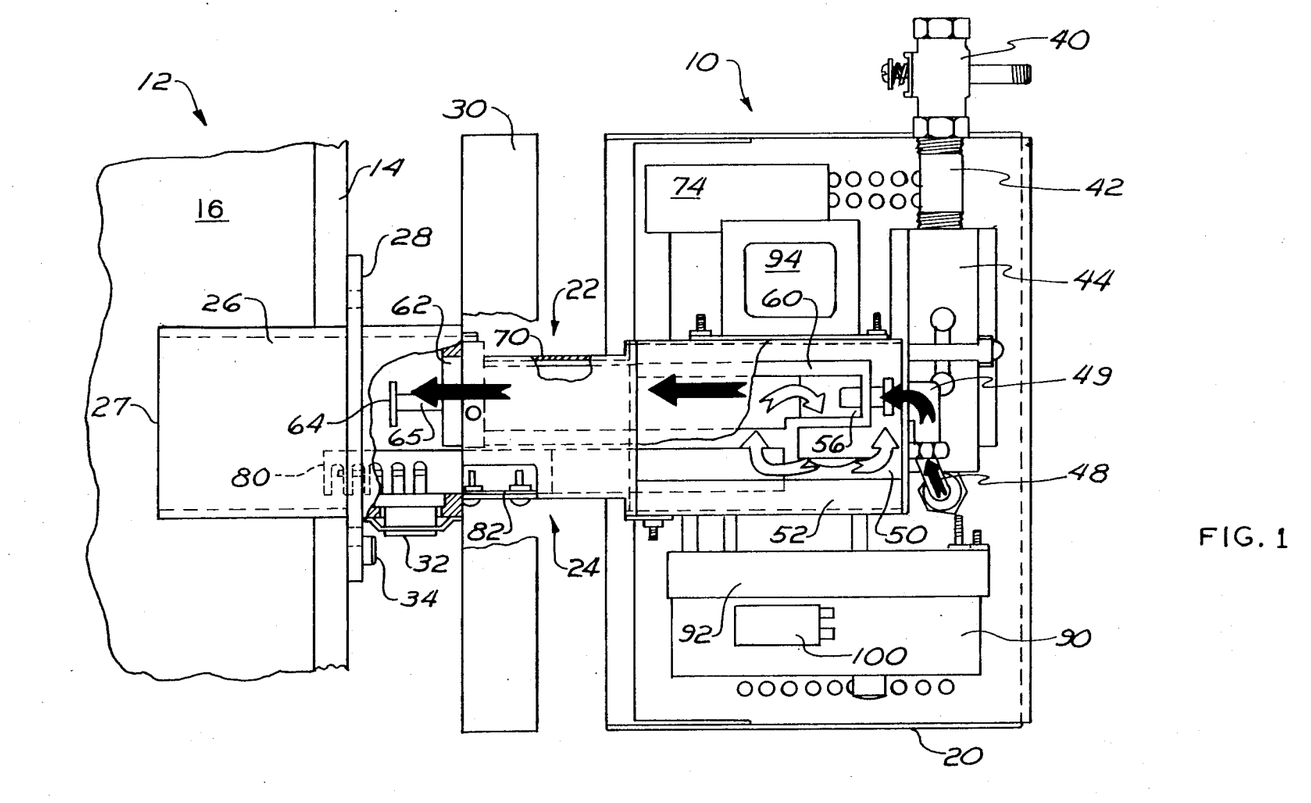
FIG. 1 is an interior top plan view, partly in section and partly broken away, of a power gas burner system in accordance with the present invention with said system being illustrated mounted to a portion of a stove.
Figure 2:
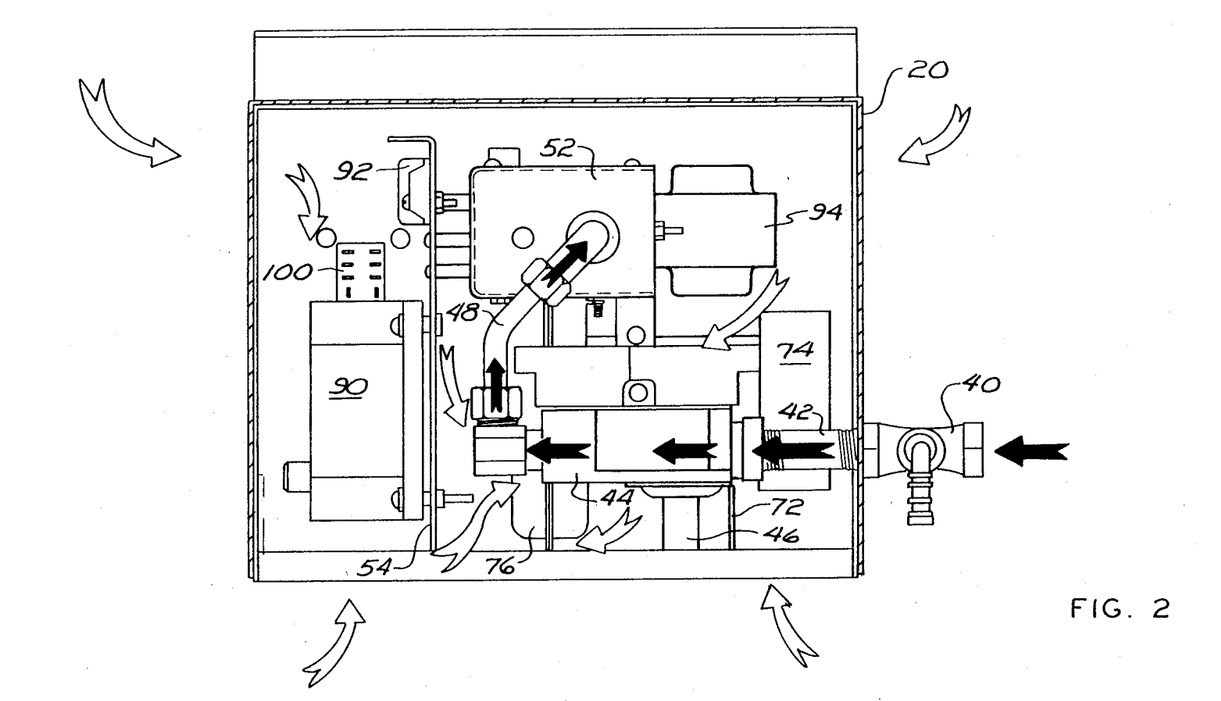
FIG. 2 is an interior rear elevational view of the power gas burner system of FIG. 1.

With reference to FIGS. 1 and 2, a substantially rectangular housing 20 encloses the controls for the power gas burner. A nozzle assembly 22 and an ignitor assembly 24 project forwardly in generally parallel relationship through a front wall of the housing. A blast tube 26 having a generally cylindrical shape has an end wall with openings for receiving the forward ends of nozzle assembly 22 and ignitor assembly 24. Blast tube 26 is a metal casting having a generally uniform inside diameter of approximately 3 inches. The blast tube functions as a combustion chamber as well as a barrel for propelling the combustants through the output end 27 into the fire box. An intermediate circumferentially extending mounting collar 28 radially extends from the blast tube. The collar 28 abuts against the exterior rear panel of the wood stove. The forward or output end of the blast tube extends into the fire box of the wood stove. Bolts 34 (only one illustrated) extend through angularly spaced slots 29 in the collar for securely fastening the blast tube to the stove.

A heat shield 30 having an inverted L-shaped section abuts the rear end of the blast tube. The heat shield provides a thermal barrier between the forward portions of the power gas burner located in the vicinity of the blast tube combustion chamber and the control and circuitry components of the burner primarily housed within housing 20.

A flue block switch 32 is mounted in an opening of approximately one inch diameter in the side of the blast tube 26 between the collar 28 and the heat shield 30. Flue block switch 32 is a bi-metallic switch such as model 49T-11 marketed by Therm-O-Disc. The flue block switch 32 functions to detect a blockage in the flue (not illustrated) leading from the stove 12. Switch 32 senses an increase in the flame temperature within the blast tube due to the flue blockage resulting back pressure to the flame front. In addition, the flue block switch 32 senses the resulting temperature increase of the flame front within the blast tube due to the opening of the front or side door of the wood stove which also results in a back pressure to the flame front. The flue block switch 32 has a pre-established temperature threshold (for example 465° F.) at which a bi-metallic assembly changes states in response to the temperature changes resulting from either the opening of the stove door or the blockage of the flue to thereby open a circuit or transmit an appropriate signal to the control unit as will be detailed below. It should be appreciated that the dual sensing function of switch 32 eliminates a separate sensor or switch to detect either the opening of the stove door or flue blockage.

The output end of blast tube 26 extends preferably on the order of one inch into the fire box. The blast tube is located approximately one-half inch above the lip of the door to the fire box so that if there is a significant ash accumulation, the ash will tend to be discharged out the door rather than back into the blast tube. It should additionally be appreciated that the flue block switch 32 is also positioned and configured to detect the condition wherein a log or other fuel in the fire box is lodged in the blast tube or covers the opening of the blast tube. The latter impingement conditions also tend to increase the temperature of the flame front. Consequently, fuel blockage of the blast tube may also be detected by the flue block switch 32 which will accordingly open a circuit and/or transmit an appropriate signal to the control unit.

The blast tube 26, nozzle assembly 22, ignitor assembly 24 and housing 20 are rigidly joined to provide structural support for mounting the burner to the stove. In addition, a pair of transversely spaced angle irons (not illustrated) may also be employed to connect between the stove and the lower front portion of housing 20 to provide a mounting support for the burner.

A manual shut off valve 40 mounted at the exterior of the housing 20 connects with the fuel line (not illustrated) leading from the fuel supply. Valve 40 provides a manually operated valve for controlling the supply of fuel to the burner 10. A short fuel conduit 42 at the interior of the housing connects between valve 40 and an electronically controlled gas valve module 44. Gas valve module 44 is preferably a redundant gas valve which includes two successive automatic valves and a pressure regulator such as a series G54 redundant combination gas valve marketed by Johnson Controls, Inc. of Oak Brook, Ill. Gas valve module 44 is configured so that each of the valves are quickly closed when power supply to the valve module is interrupted. A pressure regulator 46 extends downwardly from the valve module for regulating the supply of gas to the burner. The regulator 46 is accessible through the bottom of the housing for manual adjustment.

A fuel delivery conduit 48 leads from valve module 44 toward an upwardly disposed mixing plenum 50. Mixing plenum 50 is defined by a substantially rectilinear enclosure 52. A mounting bracket 54 extends generally vertically from the bottom panel of housing 20 to provide a mounting support for enclosure 52.

Fuel conduit 48 terminates in an elbow fitting 49 which has an outlet orifice. An inshot burner nozzle 60 having a generally cylindrical form connects with fitting 49 to form a fuel communication path to the burner nozzle via the outlet orifice of fitting 49. The input end of the inshot burner nozzle is received in enclosure 52 and forms one or more air openings 56 through the side wall to provide communication between the mixing plenum 50 and the nozzle. Forced air and fuel is thoroughly mixed in the burner nozzle. The inshot burner nozzle 60 extends forwardly through the enclosure 52 and housing 20 to be received within the rear end of the blast tube 26. A ceramic element 62 is positioned at the output end of inshot burner nozzle 60. Ceramic element 62 has a plurality of small angularly spaced orifices 63 which form a venturi to direct a finely divided mixture of air and fuel generally axially toward a target 64.

Figure 3:
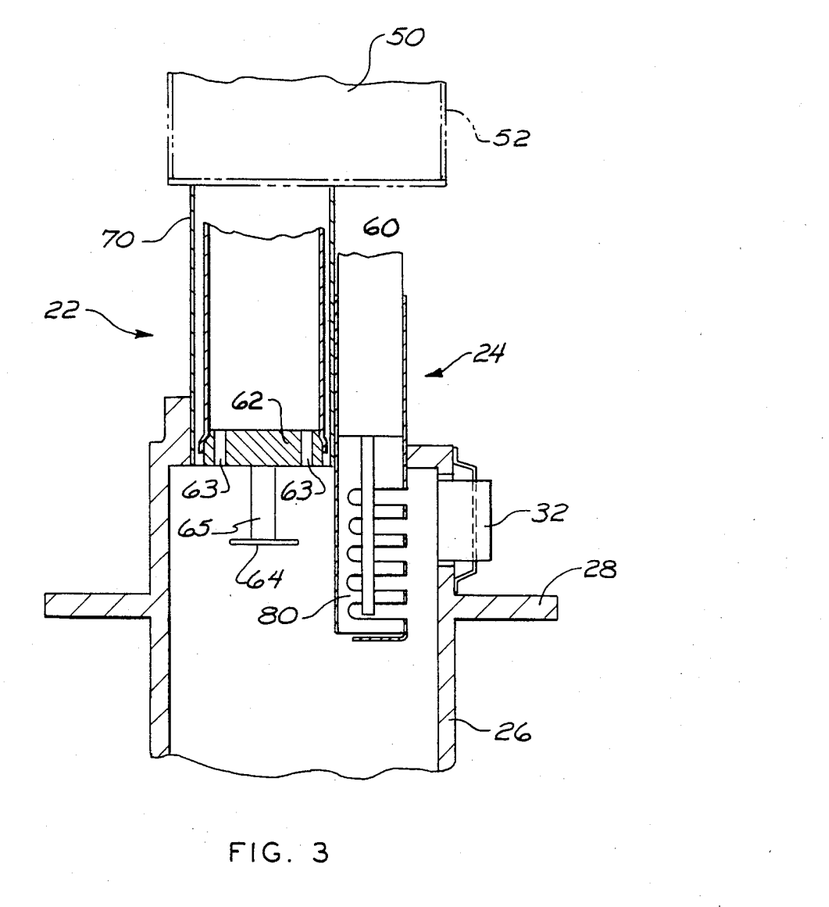
FIG. 3 is an enlarged fragmentary sectional view, partly broken away and partly in section, of the power gas burner system of FIG. 1.
Figure 4:
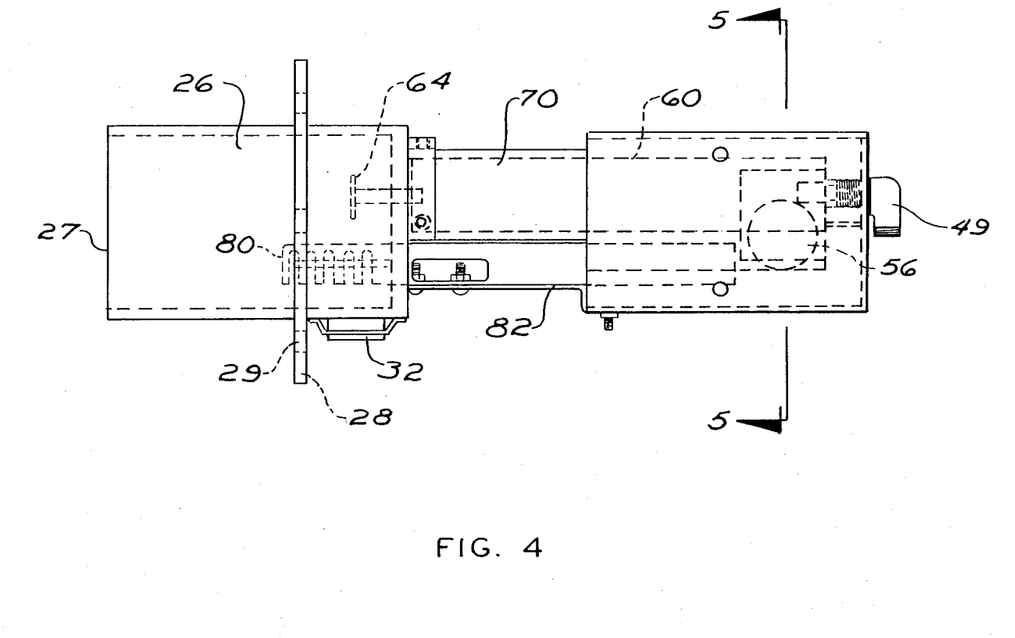
FIG. 4 is a fragmentary top plan view, partly in phantom, of the power gas burner system of FIG. 1.
Figure 5:
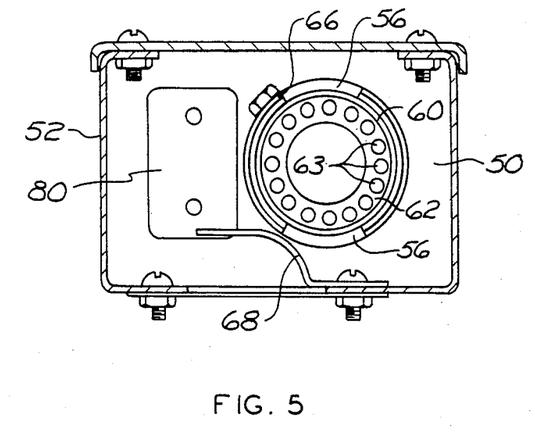
FIG. 5 is a sectional view of the power gas burner system taken along the line 5—5 of FIG. 4.
Figure 6:
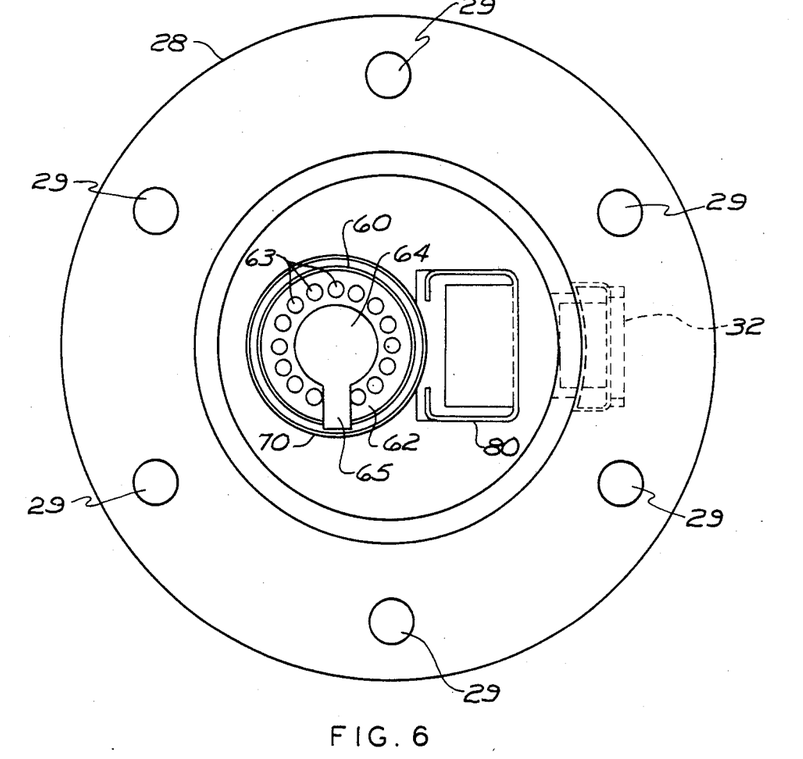
FIG. 6 is an enlarged front view, partly in phantom, of the fragmentary power gas burner system view of FIG. 4.

The target is axially spaced from the output end of the nozzle 60 and is centrally located in the output stream exiting the nozzle to provide a contact surface generally perpendicular to the stream for igniting the gases exiting the burner. The target 64 may be formed from stainless steel having a circular shape on the order of approximately 0.75 inches in diameter with an integral L-shaped mounting bracket 65. The end of the mounting bracket 65 is rigidly secured to the underside exterior output end of nozzle 60. Target 64 is positioned interiorly of the blast tube 26 generally axially aligned with switch 32 as best illustrated in FIG. 3. The bold arrows in the drawings represent the fuel path through the power burner.

A rotatable sleevelike air shutter 66 is mounted to nozzle 60 at the input portion of the nozzle. The air shutter is rotatable to selectively partially cover air openings 56 to regulate the flow of forced primary air through the burner nozzle. An air deflector 68 is mounted at the interior of the enclosure 52 to direct forced air supplied to the mixing plenum 50 toward the air openings 56.

An outer secondary nozzle 70 co-axial with inshot burner nozzle 60 extends between enclosure 52 and blast tube 26 to provide a conduit for conveying a secondary source of forced air from the enclosure 52. Nozzle 70 has an open ended cylindrical shape and is preferably formed from an aluminum steel composition. The annular secondary air stream exiting nozzle 70 is directed generally axially into the blast tube.

A bracket 72 extends vertically from the lower panel of the housing to mount a blower 74. Blower 74 is electronically controlled to provide forced air for the power burner. The air flow path is generally designated by the open arrows in the drawings. The forced air is conveyed to mixing plenum 50 by a vertically extending air manifold 76. In preferred form, blower 74 is a model V02B blower having a centrifugal switch and marketed by Fasco. The forced air is supplied to the mixing plenum 50 wherein the forced air is directed through inshot burner nozzle 60 as primary air and secondary nozzle 70 as secondary air to faciliate combustion of the fuel in the blast tube as will be further detailed below.

The ignitor assembly 24 comprises an ignitor 80 which is anchored in enclosure 52 and extends through the front walls of enclosure 52 and housing 20 generally parallel to nozzle 70 with the forward heat generating portion of the ignitor being enclosed within blast tube 26 in the general vicinity of target 64. An ignitor bracket 82 is bolted to the enclosure and extends forwardly to connect against an intermediate portion of the ignitor to provide additional mounting support for the ignitor. Ignitor 80 is an electrically energizable ignitor having a heating element which generates heat along a generally vertically disposed surface for heating the target 64 to a temperature sufficient to combust the mixture exiting nozzle 60. In preferred form, ignitor 80 also functions as a thermocouple to verify that the burner is properly operating by sensing the heat in the formed combustion chamber of the blast tube in the vicinity of target 64. A Norton 501A ignitor may be suitably employed as ignitor 80. A silicon carbide element is employed to function as both a heat generating element and a combustion detecting element.

Figure 7:
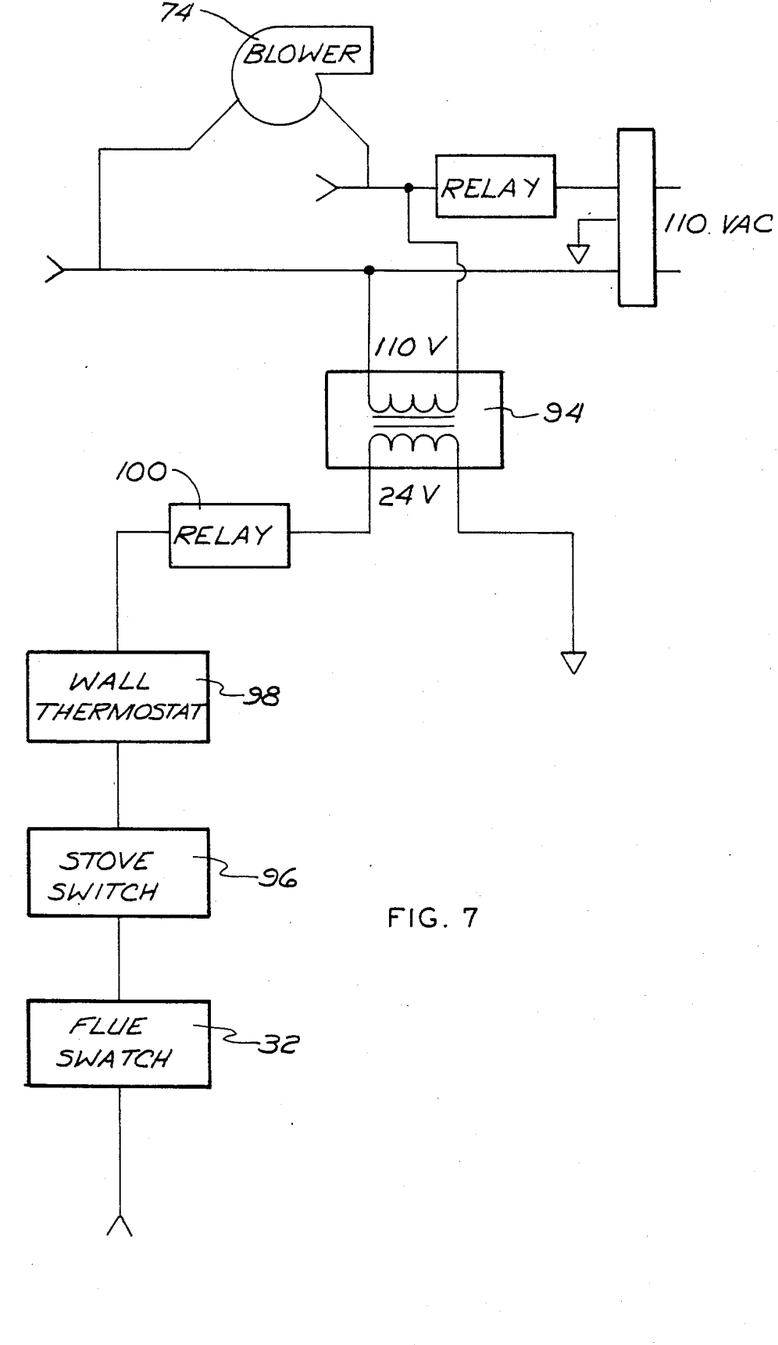
FIG. 7 is a schematic diagram of a portion of the electrical system of the power gas burner system of FIG. 1.

With additional reference to FIGS. 1, 2 and 7, the power gas burner is automatically controlled by a solid state pre-packaged electronic controller 90 such as control model number 05-212226-103 marketed by Fenwal Incorporated, Division of Walter Kidde & Company, Inc. Electronic controller 90 is mounted to mounting bracket 54 and located within housing 20. Electrical lines are connected at a terminal board 92 mounted within the housing. A transformer 94 is mounted to enclosure 52 to provide a step-down 24 VAC power supply for operating gas valve module 44. Blower 74 and ignitor 80 are powered by a 110 VAC power supply. Flue switch 32, a stove switch 96 and a wall thermostat 98 electrically connect via a relay 100 with the electronic controller 90.

The operational sequence of the power gas burner is initiated by supplying electrical power to the burner and manually opening valve 40 so that the fuel supply is connected with the burner. In the event that the wall thermostat 98 calls for heat, stove switch 96 indicates that the stove is cool and flue switch 32 indicates that the stove flue is not blocked, the blower 74 is energized to purge the burner system by forcing air through the air passages, the nozzle assembly 22 and the blast tube 26. The ignitor 80 is also energized for heating target 64. The duration of the blower purging and the ignitor preheat cycle is on the order of 40 seconds. An ignition trial period which lasts for approximately 6.8 seconds commences with the electronic controller 90 opening the valves of valve module 44 so that fuel is supplied to the inshot burner nozzle 60 along with the forced air from the blower. The electronic controller 90 also functions to transform the ignitor 80 into a temperature sensor so that as the mixture of air and fuel exits the inshot burner nozzle 60 to impinge against the target 64 in the presence of secondary air from nozzle 70, the local temperature resulting from combustion of the air fuel mixture will be sensed by the ignitor. The forced air propels the combustants through the blast tube outlet opening 27 into the fire box of the wood stove.

The power burner continues operation wherein fuel and air are continuously supplied to the inshot burner nozzle 60 for mixing and rapid ejection through the nozzle outlet for combustion at target 64 in the presence of secondary air supplied through the outer nozzle 70 until certain burner termination conditions occur. The electronic controller 90 receives an input indicative of a sensed termination condition, and the electronic controller transmits an appropriate electrical signal for terminating the supply of fuel to the burner nozzle 60 by closing the valves of gas valve module 44. The closing signal is normally in the form of an interruption of power supply to the valve module 44. In addition, operation of the blower 74 is also terminated by interrupting the electrical power to the blower.

In the event that the wall thermostat 98 senses that the pre-established threshold temperature level has been attained, an appropriate electrical signal is transmitted to the electronic controller for terminating the combustion cycle. In the event that the stove 12 heats above the preset temperature as sensed by stove switch 96, an appropriate electrical signal is also transmitted to the electronic controller for terminating the combustion cycle. In the event that the stove flue is blocked by more than a pre-established area proportion such as 60 percent or that the door to the wood stove is opened or that the blast tube output end is blocked off by fuel materials in the fire box as sensed by the flue block switch 32, an appropriate electrical signal is also transmitted to the electronic controller for terminating the combustion cycle. In the event that there is a loss of flame in the combustion region of the blast tube as sensed by ignitor 80, an appropriate electrical signal is also transmitted to the electronic controller for terminating the combustion cycle. In addition, in the event that the operation of the blower is terminated as sensed by a centrifugal switch on the blower, an appropriate electrical signal is transmitted to the electronic controller for terminating the combustion cycle. The foregoing termination signals may be generated by a switch opening a circuit to disable an enabling current to various components.

If wood or other combustibles are loaded in the fire box, the power gas burner propels a gas flame through the blast tube to ignite the combustible material in the fire box. Upon the attainment of a sufficient temperature level from the combustion within the fire box, the stove switch 96 is tripped and the combustion cycle of the burner 10 is terminated as previously described. It should be appreciated that no kindling is required to initiate the combustion of the wood or other fuel in the fire box. The operation of the power burner and the normal wood combustion cycle are efficiently coordinated in a complementary fashion so that heat may be generated from the wood stove in an efficient and continuous manner. During the ignition trial period if no ignition is initiated by the ignitor 80, the ignition systems locks out until manually reset. The ignition sequencing may only be reinitiated by either unplugging or replugging the power cord (not illustrated) to the burner or resetting the wall thermostat 98.

While a preferred embodiment of the foregoing power gas burner has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A power burner adaptable for use in conjunction with a woodburning stove comprising:
    blower means selectively energizable to produce a flow of air;
    fuel supply means including a fuel inlet, a delivery conduit and a fuel valve activatable to provide selective fuel communication between said fuel inlet and said conduit;
    fuel nozzle means having a first inlet communicating with said air flow, a second inlet communicating with said delivery conduit and a nozzle outlet means for mixing air and fuel and propelling the mixture of air and fuel through said nozzle outlet means along a generally unidirectional exit path;
    secondary nozzle means communicating with said air flow for directing a secondary air stream in the vicinity of the mixture in said exit path;
    a target spaced from said nozzle outlet means and interposed in the exit path;
    heating means spaced from said target to heat said target to a temperature sufficient to ignite the mixture traversing the exit path;
    a blast tube surrounding said target and forming an axially extending passageway having an outlet opening; and
    electronic control means automatically responsive to an operational condition so that when said condition is satisfied and fuel is supplied to the fuel inlet, said blower means is energized, said fuel valve is activated and said target is heated to combust fuel in said blast tube and propel said combusted fuel toward the outlet opening of said blast tube.

2. The power burner of claim 1 wherein said blast tube has a substantially cylindrical shape, said outlet opening being located at one tube end and said nozzle outlet means and said heating means being positioned at a second end portion of said blast tube opposite said outlet opening.

3. The power burner of claim 2 further comprising a collar radially extending from said blast tube at an intermediate axial position thereof.

4. The power burner of claim 1 further comprising a temperature switch means mounted to said blast tube at an axial location generally aligned with the axial position of said target to sense a pre-established temperature threshold.

5. The power burner of claim 4 wherein said switch means is a bi-metallic assembly which activates an electrical switch in the event that the temperature in the vicinity of said target exceeds a pre-established threshold.

6. The power burner of claim 1 wherein said fuel nozzle means comprises a first tube of generally cylindrical shape and said secondary nozzle means comprises a second tube of generally cylindrical shape surrounding said fuel nozzle means tube in generally concentric relationship therewith.

7. The power burner of claim 1 wherein said heating means comprises a dual mode ceramic element which functions in one mode to heat the target and in a second mode functions as a thermocouple to sense the occurrence of combustion in the vicinity of the target.

8. The power burner of claim 4 wherein said electronic control means is responsive to the temperature switch means to automatically terminate the operation of the blower means and the heating means and terminate the supply of fuel to the fuel nozzle means in the event that the sensed temperature exceeds a pre-established threshold.

* * * * *